United States Patent
Maruyama et al.

(10) Patent No.: US 9,405,081 B2
(45) Date of Patent: Aug. 2, 2016

(54) OPTICAL TRANSMITTING APPARATUS

(71) Applicant: Fujitsu Optical Components Limited, Kawasaki-shi, Kanagawa (JP)

(72) Inventors: Shinji Maruyama, Sapporo (JP); Seimi Sasaki, Sagamihara (JP); Kohei Shibata, Isehara (JP); Teruhiro Kubo, Kitahiroshima (JP); Shintaro Takeuchi, Sapporo (JP); Hiroshi Kato, Kawasaki (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/629,899

(22) Filed: Feb. 24, 2015

(65) Prior Publication Data
US 2015/0253521 A1    Sep. 10, 2015

(30) Foreign Application Priority Data

Mar. 7, 2014    (JP) ................. 2014-044603

(51) Int. Cl.
*G02B 6/00* (2006.01)
*G02B 6/42* (2006.01)
*G02F 1/225* (2006.01)

(52) U.S. Cl.
CPC .............. *G02B 6/4244* (2013.01); *G02F 1/225* (2013.01); *G02F 2201/18* (2013.01); *G02F 2201/58* (2013.01); *G02F 2203/28* (2013.01)

(58) Field of Classification Search
None
See application file for complete search history.

(56) References Cited

U.S. PATENT DOCUMENTS

| | | | |
|---|---|---|---|
| 6,819,872 B2 * | 11/2004 | Farries ................. | G02B 6/2861 398/102 |
| 9,081,139 B2 * | 7/2015 | Okamura ............... | G02B 6/125 |
| 2006/0056002 A1 * | 3/2006 | Wooten .................. | G02F 1/225 359/245 |

FOREIGN PATENT DOCUMENTS

| | | |
|---|---|---|
| JP | 2003-069504 | 3/2003 |
| JP | 2008-233556 | 10/2008 |
| JP | 2012-191756 | 10/2012 |

* cited by examiner

*Primary Examiner* — Ryan Lepisto
*Assistant Examiner* — Eren Chiem
(74) *Attorney, Agent, or Firm* — Staas & Halsey LLP

(57) ABSTRACT

An optical transmitting apparatus includes: a substrate; optical modulators that are arranged in parallel to one another on the substrate and modulate light; waveguides that are formed on the substrate and guide signal light represented by at least one of modulated light beams obtained by the light being modulated by the plurality of optical modulators and monitor light represented by at least another one of the modulated light beams other than the signal light; lenses that collimate the signal light and the monitor light emitted from the waveguides; and a holding member that causes the signal light and the monitor light to be emitted from the lenses in mutually-different directions, by holding the lenses in such a manner that the optical axis of at least one of the lenses is out of alignment in a predetermined direction with the optical axis of at least one of the waveguides.

8 Claims, 6 Drawing Sheets

OPTICAL TRANSMITTING APPARATUS

CROSS-REFERENCE TO RELATED APPLICATION

This application is based upon and claims the benefit of priority of the prior Japanese Patent Application No. 2014-044603, filed on Mar. 7, 2014, the entire contents of which are incorporated herein by reference.

FIELD

The embodiments discussed herein are related to an optical transmitting apparatus.

BACKGROUND

In recent years, for the use in optical communication systems, optical modulators that use a semiconductor such as indium-phosphorus (InP) (hereinafter, "semiconductor optical modulators") have been developed in place of optical modulators that use lithium niobate (LiNbO3) (hereinafter, "LN optical modulators"). Because it is possible to arrange electric field application efficiency of semiconductor modulators to be larger than that of LN modulators, it is easier to lower the driving voltage and to realize a compact design, with semiconductor modulators.

However, because semiconductors have a higher degree of optical confinement than lithium niobate (LiNbO3), the waveguide mode profile of semiconductors is smaller than that of lithium niobate. For this reason, when modulated light that is output from a semiconductor optical modulator is emitted from a waveguide into a space, the divergence angle of the modulated light is larger than the divergence angle of modulated light output from an LN optical modulator. In this situation, the modulated light output from the semiconductor optical modulator contains signal light and monitor light that monitors the signal light. The increase in the divergence angle of the modulated light is not desirable, because when the divergence angle is large, there is a possibility that interference may be caused between signal light beams and/or between monitor light beams.

To cope with this situation, a known optical transmitting apparatus is configured so that, for the purpose of preventing the divergence angle from becoming large, a plurality of collimate lenses are provided on the subsequent stage side of a plurality of waveguides that guide signal light and monitor light. In the optical transmitting apparatus, the plurality of collimate lenses are held by a holding member in such a manner that the optical axes of the plurality of waveguides are aligned with the optical axes of the plurality of collimate lenses, respectively. Further, the signal light and the monitor light that are emitted from the waveguides into the space are collimated by the plurality of collimate lenses. The signal light and the monitor light collimated by the plurality of collimate lenses are emitted from the plurality of collimate lenses in mutually the same emission direction.

Patent Document 1: Japanese Laid-open Patent Publication No. 2003-69504

According to the conventional technique described above, however, a problem arises where the apparatus becomes large-sized due to the positional relationship among the component parts along the emission direction of the signal light or the monitor light.

Let us further discuss this issue. According to the conventional technique described above, because the signal light and the monitor light are emitted from the plurality of collimate lenses in mutually the same direction, the positional arrangement of the component parts provided on the subsequent stage side of the plurality of collimate lenses is limited. For example, let us discuss a situation in which a polarization beam combining element configured to perform a polarization beam combining process on the signal light and a light receiving element configured to receive the monitor light are provided on the subsequent stage side of the plurality of collimate lenses. In that situation, the positional relationship between the polarization beam combining element and the light receiving element is limited by the emission direction of the signal light and the monitor light from the plurality of collimate lenses. As a result, there is a possibility that the apparatus may need to be large-sized in accordance with the positional relationship between the polarization beam combining element and the light receiving element along the emission direction of the signal light or the monitor light.

SUMMARY

According to an aspect of an embodiment, an optical transmitting apparatus includes a substrate; a plurality of optical modulators that are arranged in parallel to one another on the substrate along a width direction of the substrate and that modulate light; a plurality of waveguides that are formed on the substrate and that guide signal light represented by at least one of a plurality of modulated light beams obtained by the light being modulated by the plurality of optical modulators and monitor light represented by at least another one of the plurality of modulated light beams other than the signal light; a plurality of lenses that collimate the signal light and the monitor light emitted from the plurality of waveguides; and a holding member that causes the signal light and the monitor light to be emitted from the plurality of lenses in mutually-different directions, by holding the plurality of lenses in such a manner that an optical axis of at least one of the plurality of lenses is out of alignment in a predetermined direction with an optical axis of at least one of the plurality of waveguides.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited to the embodiments described below.

[a] First Embodiment

Figure 1:
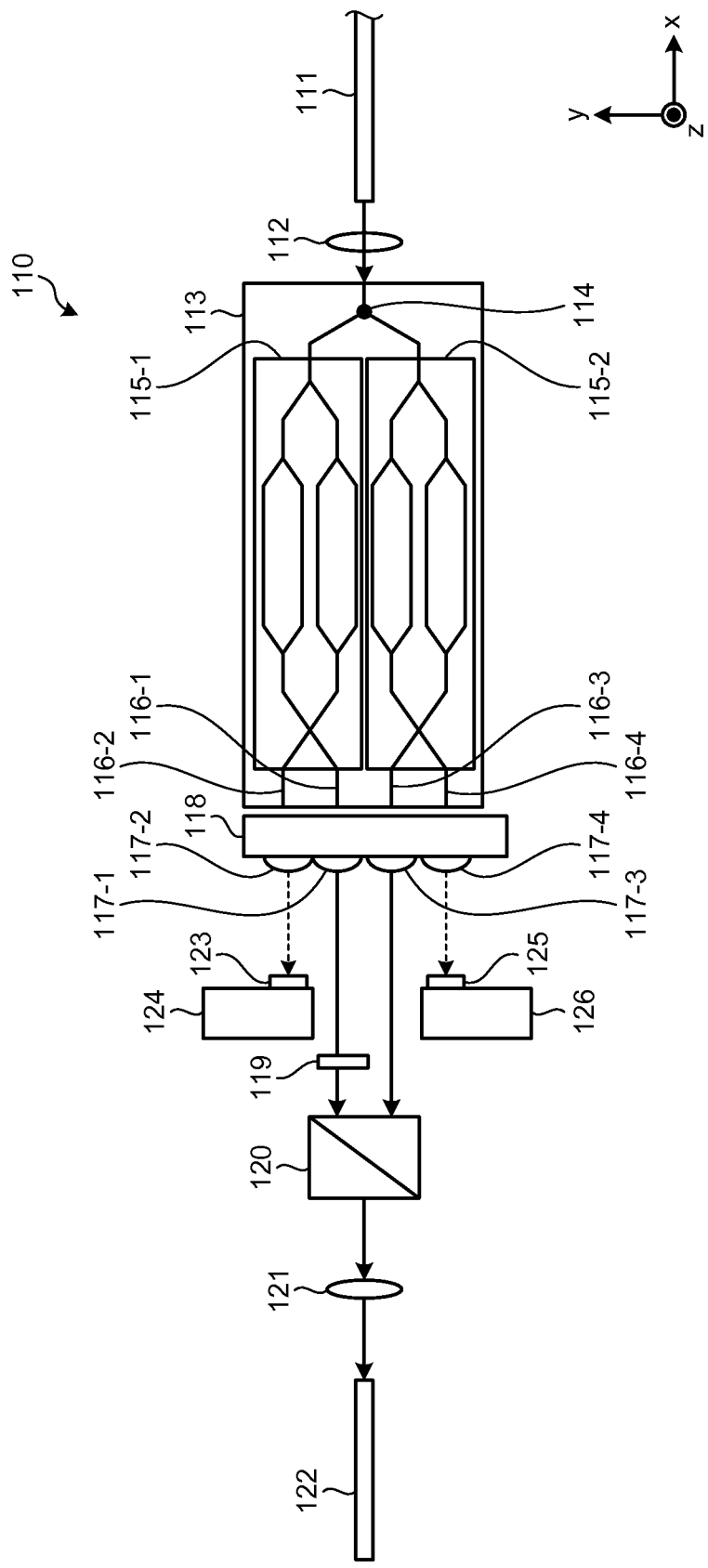
FIG. 1 is a drawing of an exemplary configuration of an optical transmitting apparatus that serves as a premise of a first embodiment.

First, before explaining an exemplary configuration of an optical transmitting apparatus of a first embodiment, an exemplary configuration of an optical transmitting apparatus that serves as a premise thereof will be explained. FIG. 1 is a drawing of an exemplary configuration of an optical transmitting apparatus that serves as a premise of the first embodiment.

An optical transmitting apparatus 110 illustrated in FIG. 1 includes an optical fiber 111, a lens 112, a substrate 113, an optical branch path 114, optical modulators 115-1 and 115-2, and waveguides 116-1 to 116-4. Further, the optical transmitting apparatus 110 includes collimate lenses 117-1 to 117-4 and a holding member 118. In addition, the optical transmitting apparatus 110 includes a wavelength plate 119, a polarization beam combiner (PBC) 120, a lens 121, and an optical fiber 122. Furthermore, the optical transmitting apparatus 110 includes a photodiode (PD) 123, a positioning member 124, another PD 125, and another positioning member 126.

In FIG. 1, it is assumed that an x-axis is defined along the length direction of the substrate 113, whereas a y-axis is defined along the width direction of the substrate 113, and a z-axis is defined along the thickness direction of the substrate 113. Further, it is assumed that the positive direction of the x-axis corresponds to the opposite side of the collimate lenses 117-1 to 117-4 along the length direction of the substrate 113. Further, the positive direction of the y-axis corresponds to the opposite side of the optical modulator 115-2 along the width direction of the substrate 113. Further, the positive direction of the z-axis corresponds to the front surface side of the substrate 113 along the thickness direction of the substrate 113 on which the optical branch path 114, the optical modulators 115-1 and 115-2, and the waveguides 116-1 to 116-4 are provided.

The optical fiber 111 is configured to output light that is emitted by a light source (not illustrated) toward the lens 112. The lens 112 is configured to collect the light output from the optical fiber 111. The substrate 113 is a substrate on which the optical branch path 114, the optical modulators 115-1 and 115-2, and the waveguides 116-1 to 116-4 are provided.

The optical branch path 114 is configured to branch the light collected by the lens 112 into two light beams by using a coupler or the like, to output one of the two light beams obtained by the branching process to the optical modulator 115-1, and to output the other light beam to the optical modulator 115-2.

The optical modulators 115-1 and 115-2 are provided in parallel to each other along the width direction of the substrate 113, i.e., along the y-axis direction. The optical modulators 115-1 and 115-2 are, for example, Mach-Zehnder optical modulators. Of the two optical modulators, the optical modulator 115-1 is configured to modulate one of the light beams that is input thereto from the optical branch path 114, by using an electric signal. As a result of the optical modulation by the optical modulator 115-1, two modulated light beams are obtained. Of the two modulated light beams, one modulated light beam is signal light, whereas the other modulated light beam is monitor light that monitors the signal light. The optical modulator 115-1 is configured to output the signal light to the waveguide 116-1 and to output the monitor light to the waveguide 116-2.

The optical modulator 115-2 is configured to modulate the other of the light beams that is input thereto from the optical branch path 114, by using an electric signal. As a result of the optical modulation by the optical modulator 115-2, two modulated light beams are obtained. Of the two modulated light beams, one modulated light beam is signal light, whereas the other modulated light beam is monitor light that monitors the signal light. The optical modulator 115-2 is configured to output the signal light to the waveguide 116-3 and to output the monitor light to the waveguide 116-4.

The waveguides 116-1 to 116-4 are formed on the substrate 113 and are configured to guide the signal light and the monitor light. More specifically, the waveguides 116-1 to 116-4 are formed on the substrate 113 in such a manner that the waveguides 116-1 and 116-3 that guide the signal light are interposed between the waveguides 116-2 and 116-4 that guide the monitor light, along the y-axis direction. Further, the waveguide 116-1 guides the signal light that is input thereto from the optical modulator 115-1 in the negative direction of the x-axis. Further, the waveguide 116-2 guides the monitor light that is input thereto from the optical modulator 115-1 in the negative direction of the x-axis. Further, the waveguide 116-3 guides the signal light that is input thereto from the optical modulator 115-2 in the negative direction of the x-axis. Furthermore, the waveguide 116-4 guides the monitor light that is input thereto from the optical modulator 115-2 in the negative direction of the x-axis.

The collimate lenses 117-1 to 117-4 are collimate lenses which are formed by using silicon, for example, and of which the curvature radii are equal to one another. The collimate lenses 117-1 to 117-4 are configured to collimate the signal light and the monitor light emitted from the waveguides 116-1 to 116-4. More specifically, the collimate lens 117-1 is configured to collimate the signal light emitted from the waveguide 116-1. The collimate lens 117-2 is configured to collimate the monitor light emitted from the waveguide 116-2. The collimate lens 117-3 is configured to collimate the signal light emitted from the waveguide 116-3. The collimate lens 117-4 is configured to collimate the monitor light emitted from the waveguide 116-4.

The holding member 118 is formed by using silicon, for example, and is configured to hold the collimate lenses 117-1 to 117-4 in an array formation along the y-axis direction. More specifically, the holding member 118 holds the collimate lenses 117-1 to 117-4, in such a manner that the optical axes of the waveguides 116-1 to 116-4 are aligned with the optical axes of the collimate lenses 117-1 to 117-4, respectively. As a result, the holding member 118 causes the signal light and the monitor light to be emitted from the collimate lenses 117-1 to 117-4 in mutually the same emission direction, i.e., the negative direction of the x-axis.

The wavelength plate 119 is configured to arrange the polarization of the signal light emitted from the collimate lens 117-1 to be rotated by 90 degrees with respect to the polarization of the signal light emitted from the collimate lens 117-3. The PBC 120 is a polarization beam combining element configured to perform a polarization beam combining process on the signal light of which the polarization is rotated by the wavelength plate 119, with the signal light emitted from the collimate lens 117-3 and to emit polarization multiplexed signal light obtained by performing the polarization beam combining process on the signal light, to the lens 121. The lens 121 is configured to collect the polarization multiplexed signal light emitted from the PBC 120. The optical fiber 122 is configured to transfer the polarization multiplexed signal light collected by the lens 121 to the subsequent stage side. The PD 123 is a light receiving element configured to receive the monitor light emitted from the collimate lens 117-2. The positioning member 124 is configured to arrange the PD 123 into a position on the side of one of the lateral faces of the PBC 120 along the y-axis direction. The PD 125 is a light receiving element configured to receive the monitor light emitted from the collimate lens 117-4. The positioning member 126 is configured to arrange the PD 125 into a position on the side of the other lateral face of the PBC 120 along the y-axis direction.

Next, a problem of the optical transmitting apparatus 110 illustrated in FIG. 1 will be explained. The optical transmitting apparatus 110 is configured in such a manner that the signal light and the monitor light are emitted from the collimate lenses 117-1 to 117-4 in mutually the same emission direction, i.e., the negative direction of the x-axis. Thus, the positions in which the PBC 120, the PD 123, and the PD 125, which are disposed on the subsequent stage side of the collimate lenses 117-1 to 117-4, can be arranged are limited to positions along the x-axis direction. For example, the positioning member 124 needs to arrange the PD 123 to be in such a position that is on the side of the one of the lateral faces of the PBC 120 along the y-axis direction and that is along the x-axis direction. Further, the positioning member 126 needs to arrange the PD 123 to be in such a position that is on the side of the other lateral face of the PBC 120 along the y-axis direction and that is along the x-axis direction.

However, when the positions in which the PBC 120, the PD 123, and the PD 125 can be arranged are limited to positions along the x-axis direction, the optical transmitting apparatus 110 has a possibility of increasing in size along the y-axis direction, in correspondence with the sizes of the positioning member 124 and the positioning member 126. In other words, the optical transmitting apparatus 110 has a possibility of becoming large-sized, due to the positional relationship among the PBC 120, the PD 123, and the PD 125 along the emission direction of the signal light or the monitor light. To cope with this situation, an optical transmitting apparatus according to the first embodiment is presented with a devised mode of holding the plurality of collimate lenses configured to emit signal light and monitor light, for the purpose of preventing the apparatus from becoming large-sized due to the positional relationship among a PBC and PDs along the emission direction of the signal light or the monitor light.

Figure 2:
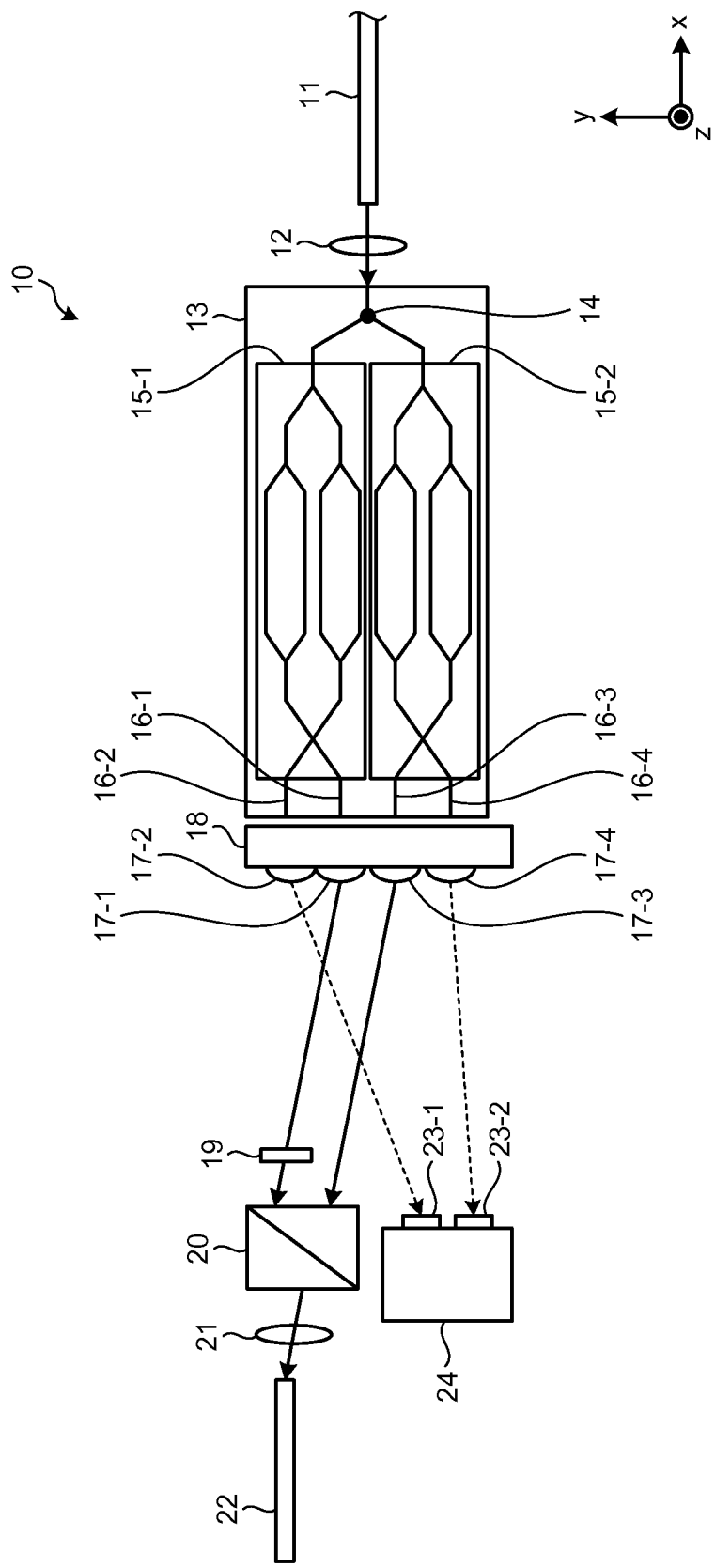
FIG. 2 is a drawing of an exemplary configuration of an optical transmitting apparatus according to the first embodiment.

Next, an exemplary configuration of an optical transmitting apparatus 10 according to the first embodiment will be explained, with reference to FIG. 2. FIG. 2 is a drawing of an exemplary configuration of an optical transmitting apparatus according to the first embodiment.

The optical transmitting apparatus 10 illustrated in FIG. 2 includes: an optical fiber 11, a lens 12, a substrate 13, an optical branch path 14, optical modulators 15-1 and 15-2, and waveguides 16-1 to 16-4. Further, the optical transmitting apparatus 10 includes collimate lenses 17-1 to 17-4 and a holding member 18. In addition, the optical transmitting apparatus 10 includes a wavelength plate 19, a PBC 20, a lens 21, and an optical fiber 22. Furthermore, the optical transmitting apparatus 10 includes PDs 23-1 and 23-2, and a positioning member 24.

In FIG. 2, it is assumed that an x-axis is defined along the length direction of the substrate 13, whereas a y-axis is defined along the width direction of the substrate 13, and a z-axis is defined along the thickness direction of the substrate 13. Further, it is assumed that the positive direction of the x-axis corresponds to the opposite side of the collimate lenses 17-1 to 17-4 along the length direction of the substrate 13. Further, the positive direction of the y-axis corresponds to the opposite side of the optical modulator 15-2 along the width direction of the substrate 13. Further, the positive direction of the z-axis corresponds to the front surface side of the substrate 13 along the thickness direction of the substrate 13 on which the optical branch path 14, the optical modulators 15-1 and 15-2, and the waveguides 16-1 to 16-4 are provided.

The optical fiber 11 is configured to output light that is emitted by a light source (not illustrated) toward the lens 12. The lens 12 is configured to collect the light output from the optical fiber 11. The substrate 13 is a substrate on which the optical branch path 14, the optical modulators 15-1 and 15-2, and the waveguides 16-1 to 16-4 are provided.

The optical branch path 14 is configured to branch the light collected by the lens 12 into two light beams by using a coupler or the like, to output one of the two light beams obtained by the branching process to the optical modulator 15-1, and to output the other light beam to the optical modulator 15-2.

The optical modulators 15-1 and 15-2 are provided in parallel to each other along the width direction of the substrate 13, i.e., along the y-axis direction. The optical modulators 15-1 and 15-2 are, for example, Mach-Zehnder optical modulators. Of the two optical modulators, the optical modulator 15-1 is configured to modulate one of the light beams that is input thereto from the optical branch path 14, by using an electric signal. As a result of the optical modulation by the optical modulator 15-1, two modulated light beams are obtained. Of the two modulated light beams, one modulated light beam is signal light, whereas the other modulated light beam is monitor light that monitors the signal light. The optical modulator 15-1 is configured to output the signal light to the waveguide 16-1 and to output the monitor light to the waveguide 16-2.

The optical modulator 15-2 is configured to modulate the other of the light beams that is input thereto from the optical branch path 14, by using an electric signal. As a result of the optical modulation by the optical modulator 15-2, two modulated light beams are obtained. Of the two modulated light beams, one modulated light beam is signal light, whereas the other modulated light beam is monitor light that monitors the signal light. The optical modulator 15-2 is configured to output the signal light to the waveguide 16-3 and to output the monitor light to the waveguide 16-4. In this situation, the two modulated light beams obtained as a result of the optical modulation by the optical modulator 15-1 and the two modulated light beams obtained as a result of the optical modulation by the optical modulator 15-2 serve as an example of a plurality of modulated light beams obtained as a result of optical modulations by a plurality of optical modulators. Further, the signal light output from the optical modulator 15-1 to the waveguide 16-1 and the signal light output from the optical modulator 15-2 to the waveguide 16-3 serve as an example of signal light represented by at least one of a plurality of modulated light beams. Further, the monitor light output from the optical modulator 15-1 to the waveguide 16-2 and the monitor light output from the optical modulator 15-2 to the waveguide 16-4 serve as an example of monitor light represented by at least another one of the plurality of modulated light beams other than the signal light.

The waveguides 16-1 to 16-4 are formed on the substrate 13 and are configured to guide the signal light and the monitor light. More specifically, the waveguides 16-1 to 16-4 are formed on the substrate 13 in such a manner that the waveguides 16-1 and 16-3 that guide the signal light are interposed between the waveguides 16-2 and 16-4 that guide the monitor light, along the y-axis direction. Further, the waveguide 16-1 guides the signal light that is input thereto from the optical modulator 15-1 in the negative direction of the x-axis. Further, the waveguide 16-2 guides the monitor light that is input thereto from the optical modulator 15-1 in the negative direction of the x-axis. Further, the waveguide 16-3 guides the signal light that is input thereto from the optical modulator 15-2 in the negative direction of the x-axis. Furthermore, the waveguide 16-4 guides the monitor light that is input thereto from the optical modulator 15-2 in the negative direction of the x-axis. The waveguides 16-1 to 16-4 serve as an example of a plurality of waveguides that are formed on a substrate and are configured to guide signal light and monitor light.

The collimate lenses 17-1 to 17-4 are collimate lenses which are formed by using silicon, for example, and of which the curvature radii are equal to one another. The collimate lenses 17-1 to 17-4 are configured to collimate the signal light and the monitor light emitted from the waveguides 16-1 to 16-4. More specifically, the collimate lens 17-1 is configured to collimate the signal light emitted from the waveguide 16-1. The collimate lens 17-2 is configured to collimate the monitor light emitted from the waveguide 16-2. The collimate lens 17-3 is configured to collimate the signal light emitted from the waveguide 16-3. The collimate lens 17-4 is configured to collimate the monitor light emitted from the waveguide 16-4.

The holding member 18 is formed by using silicon, for example, and is configured to hold the collimate lenses 17-1 to 17-4 in an array formation along the y-axis direction. More specifically, the holding member 18 holds the collimate lenses 17-1 to 17-4, in such a manner that the optical axis of at least one of the collimate lenses 17-1 to 17-4 is out of alignment in a predetermined direction with the optical axis of at least one of the waveguides 16-1 to 16-4. In the first embodiment, the predetermined direction is the width direction of the substrate 13, i.e., the y-axis direction. By holding the plurality of collimate lenses in such a manner that the optical axis of at least one of the collimate lenses is out of alignment in the y-axis direction with the optical axis of at least one of the waveguides, the holding member 18 causes the signal light and the monitor light to be emitted from the collimate lenses 17-1 to 17-4 in mutually-different directions. For example, let us imagine a situation in which the PDs 23-1 and 23-2 are arranged in positions on the side of one of the lateral faces of the PBC 20 along the y-axis direction. In that situation, as a result of the holding member 18 holding the plurality of collimate lenses, a signal light beam is emitted from each of the collimate lenses 17-1 and 17-3 toward the PBC 20. Further, as a result of the holding member 18 holding the plurality of collimate lenses, a monitor light beam is emitted from each of the collimate lenses 17-2 and 17-4 toward the PDs 23-1 and 23-2. Exemplary modes in which the holding member 18 holds the collimate lenses 17-1 to 17-4 will be explained later.

The wavelength plate 19 is configured to arrange the polarization of the signal light emitted from the collimate lens 17-1 to be rotated by 90 degrees with respect to the polarization of the signal light emitted from the collimate lens 17-3. The PBC 20 is a polarization beam combining element configured to perform a polarization beam combining process on the signal light of which the polarization is rotated by the wavelength plate 19, with the signal light emitted from the collimate lens 17-3 and to emit polarization multiplexed signal light obtained by performing the polarization beam combining process on the signal light, to the lens 21. The lens 21 is configured to collect the polarization multiplexed signal light emitted from the PBC 20. The optical fiber 22 is configured to transfer the polarization multiplexed signal light collected by the lens 21 to the subsequent stage side.

The PDs 23-1 and 23-2 are light receiving elements configured to receive the monitor light beams emitted from the collimate lenses 17-2 and 17-4, respectively. The positioning member 24 is configured to arrange the PDs 23-1 and 23-2 into positions on the side of one of the lateral faces of the PBC 20 along the y-axis direction.

Figure 3:
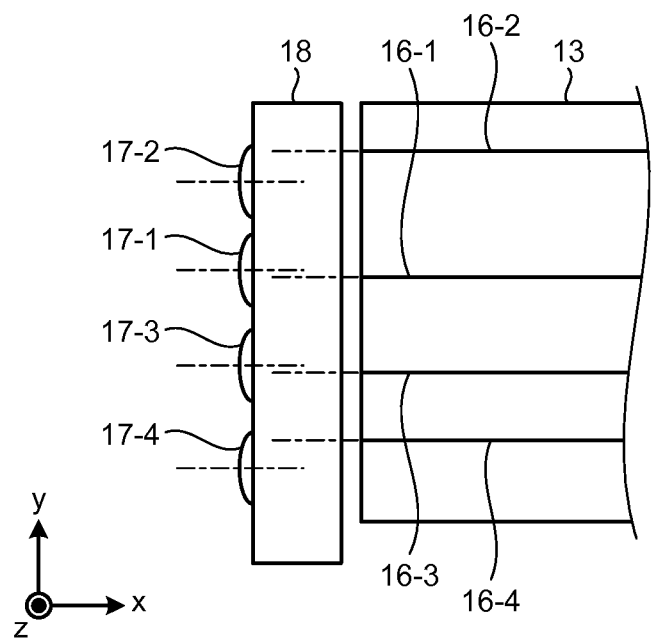
FIG. 3 is a drawing of an exemplary mode in which a holding member holds collimate lenses according to the first embodiment.

Next, an exemplary mode in which the holding member 18 holds the collimate lenses 17-1 to 17-4 will be explained. FIG. 3 is a drawing of the exemplary mode in which the holding member holds the collimate lenses according to the first embodiment. In the example illustrated in FIG. 3, it is assumed that the interval between the waveguide 16-1 and the waveguide 16-2 is different from the interval between the waveguide 16-3 and the waveguide 16-4. Further, in FIG. 3, the dashed lines indicate the optical axis of each of the waveguides 16-1 to 16-4 and the optical axis of each of the collimate lenses 17-1 to 17-4.

As illustrated in FIG. 3, the holding member 18 holds the collimate lenses 17-1 to 17-4 in such a manner that the optical axes of the collimate lenses are out of alignment in the positive direction of the y-axis with the optical axes of the waveguides for the signal light beams and that the optical axes of the collimate lenses are out of alignment in the negative direction of the y-axis with the optical axes of the waveguides for the monitor light beams. More specifically, the holding member 18 holds the collimate lens 17-1 in such a manner that the optical axis of the collimate lens 17-1 is out of alignment in the positive direction of the y-axis with the optical axis of the waveguide 16-1 guiding the signal light. Further, the holding member 18 holds the collimate lens 17-3 in such a manner that the optical axis of the collimate lens 17-3 is out of alignment in the positive direction of the y-axis with the optical axis of the waveguide 16-3 guiding the signal light. In contrast, the holding member 18 holds the collimate lens 17-2 in such a manner that the optical axis of the collimate lens 17-2 is out of alignment in the negative direction of the y-axis with the optical axis of the waveguide 16-2 guiding the monitor light. Further, the holding member 18 holds the collimate lens 17-4 in such a manner that the optical axis of the collimate lens 17-4 is out of alignment in the negative direction of the y-axis with the optical axis of the waveguide 16-4 guiding the monitor light. In this holding mode, a signal light beam is emitted from each of the collimate lenses 17-1 and 17-3 toward the PBC 20, whereas a monitor light beam is emitted from each of the collimate lenses 17-2 and 17-4 toward the PDs 23-1 and 23-2. In other words, by holding the plurality of collimate lenses in such a manner that the optical axis of at least one of the collimate lenses is out of alignment in the y-axis direction with the optical axis of at least one of the waveguides, the holding member 18 causes the signal light and the monitor light to be emitted from the collimate lenses 17-1 to 17-4 in the mutually-different directions.

Figure 4:
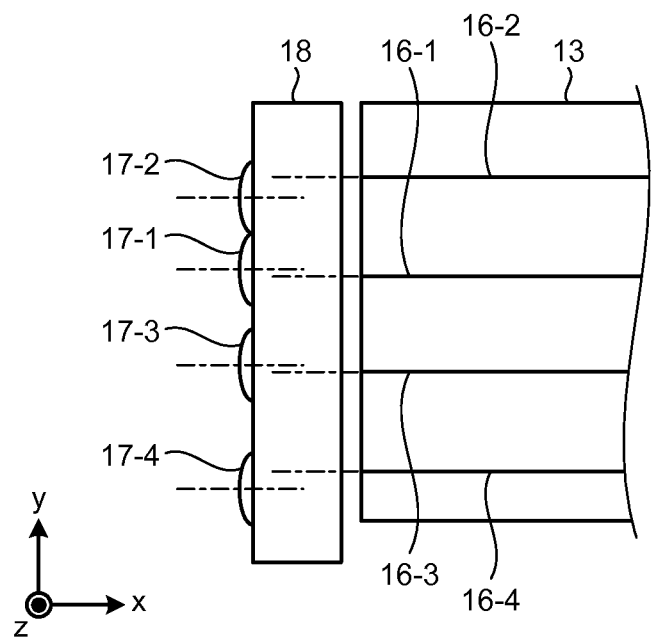
FIG. 4 is a drawing of another exemplary mode in which the holding member holds the collimate lenses according to the first embodiment.

FIG. 3 illustrates the example in which the interval between the waveguide 16-1 and the waveguide 16-2 is different from the interval between the waveguide 16-3 and the waveguide 16-4; however, the present disclosure is not limited to this example. For instance, another arrangement is acceptable in which the interval between the waveguide 16-1 and the waveguide 16-2 is equal to the interval between the waveguide 16-3 and the waveguide 16-4. FIG. 4 is a drawing of another exemplary mode in which the holding member holds the collimate lenses according to the first embodiment. In the example illustrated in FIG. 4, the interval between the waveguide 16-1 and the waveguide 16-2 is equal to the interval between the waveguide 16-3 and the waveguide 16-4. With this arrangement also, the holding member 18 holds the plurality of collimate lenses in such a manner that the optical axis of at least one of the collimate lenses is out of alignment in the y-axis direction with the optical axis of at least one of the waveguides. As a result, the holding member 18 causes the signal light and the monitor light to be emitted from the collimate lenses 17-1 to 17-4 in the mutually-different directions.

As explained above, in the optical transmitting apparatus 10 according to the first embodiment, the collimate lenses 17-1 to 17-4 collimate the signal light and the monitor light emitted from the waveguides 16-1 to 16-4. The holding member 18 causes the signal light and the monitor light to be emitted in the mutually-different directions, by holding the collimate lenses 17-1 to 17-4 in such a manner that the optical axis of at least one of the collimate lenses is out of alignment in the y-axis direction with the optical axis of at least one of the waveguides 16-1 to 16-4. As a result, according to the first embodiment, it is possible to enhance the degree of freedom in arranging the positions of the optical component parts that are disposed on the subsequent stage side of the collimate lenses 17-1 to 17-4, compared to the conventional example in which the signal light and the monitor light are emitted from the plurality of collimate lenses in mutually the same emission direction, i.e., the x-axis direction. Unlike in the conventional example, according to the first embodiment, for instance, the positions in which the PBC 20 and the PDs 23-1 and 23-2, which are disposed on the subsequent stage side of the collimate lenses 17-1 to 17-4, can be arranged are not limited to positions along the x-axis direction. As a result, according to the first embodiment, it is possible to prevent the apparatus from becoming large-sized due to the positional relationships between the PBC and the PDs along the emission direction of the signal light or the monitor light.

Further, in the optical transmitting apparatus 10 according to the first embodiment, the positioning member 24 arranges the PDs 23-1 and 23-2 in the positions on the side of the one of the lateral faces of the PBC 20 along the y-axis direction. As a result, according to the first embodiment, it is possible to prevent the apparatus from becoming large-sized along the y-axis direction.

Further, in the optical transmitting apparatus 10 according to the first embodiment, the holding member 18 holds the collimate lenses 17-1 to 17-4 in the array formation along the y-axis direction. As a result, according to the first embodiment, it is possible to prevent the apparatus from becoming large-sized along the y-axis direction, compared to the structure in which the plurality of collimate lenses are individually held along the y-axis direction.

Further, in the optical transmitting apparatus 10 according to the first embodiment, the holding member 18 and the collimate lenses 17-1 to 17-4 are formed by using silicon. Thus, according to the first embodiment, it is possible to have the holding member 18 and the collimate lenses 17-1 to 17-4 integrally formed by using an etching process or the like, and also, to arrange the collimate lenses 17-1 to 17-4 to be thin.

Further, in the optical transmitting apparatus 10 according to the first embodiment, the curvature radii of the collimate lenses 17-1 to 17-4 are equal to one another. Thus, according to the first embodiment, even when the collimate lenses 17-1 to 17-4 having mutually the same curvature radius are used, it is possible to prevent the apparatus from becoming large-sized due to the positional relationship between the PBC and the PDs along the emission direction of the signal light or the monitor light.

[b] Second Embodiment

Next, an optical transmitting apparatus according to a second embodiment will be explained. The optical transmitting apparatus according to the second embodiment is different from that of the first embodiment only for the shapes of the waveguides 16-1 to 16-4 and the mode in which the collimate lenses 17-1 to 17-4 are held. The other configurations are the same as those in the first embodiment. Accordingly, in the description below, the configurations that are the same as those in the first embodiment will be referred to by using the same reference characters, and the explanation thereof will be omitted.

Figure 5:
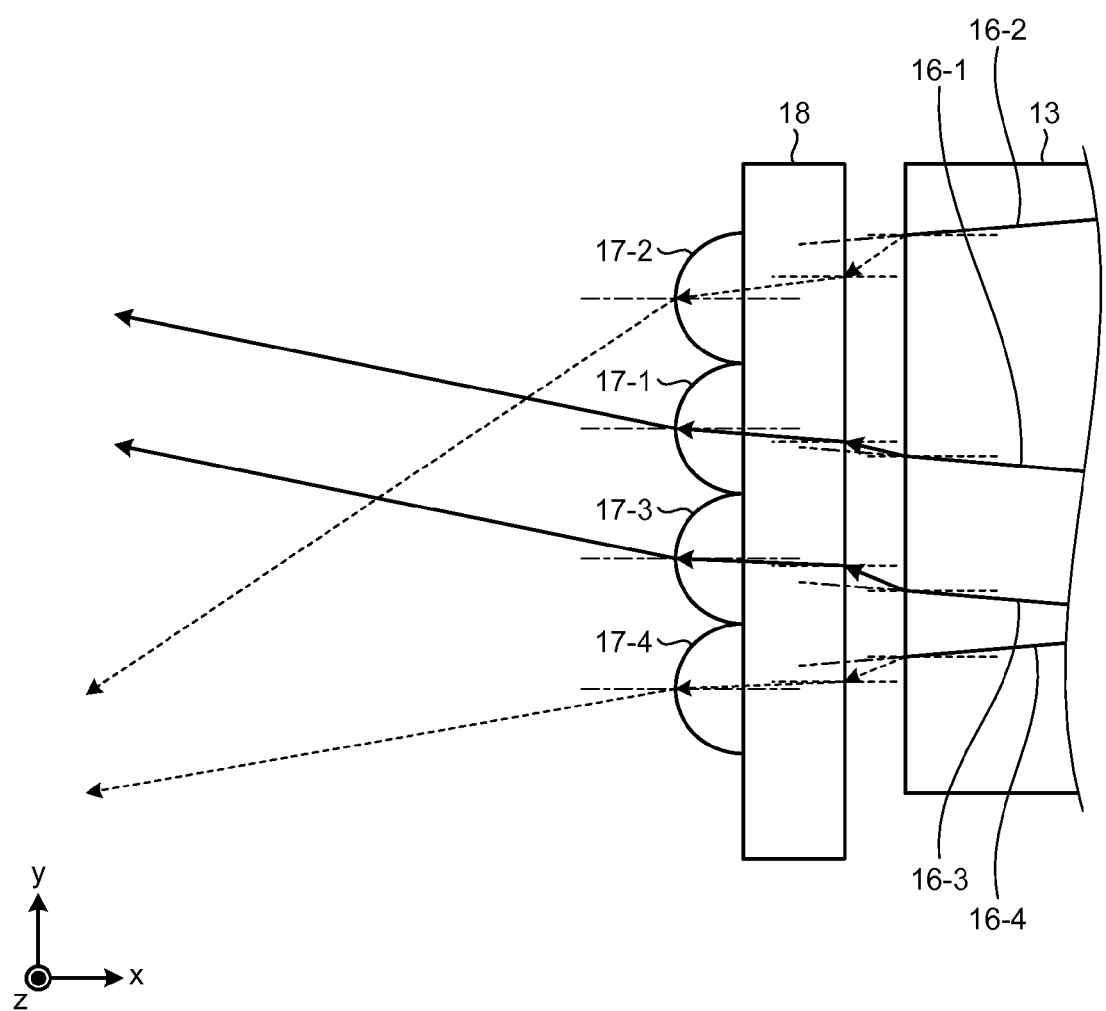
FIG. 5 is a drawing of an exemplary mode in which the holding member holds the collimate lenses according to a second embodiment.

FIG. 5 is a drawing of an exemplary mode in which the holding member holds the collimate lenses according to the second embodiment. In FIG. 5, the dashed lines indicate the optical axis of each of the waveguides 16-1 to 16-4 and the optical axis of each of the collimate lenses 17-1 to 17-4. Further, the arrows with solid lines indicate optical paths of the signal light beams, whereas the arrows with broken lines indicate optical paths of the monitor light beams.

As illustrated in FIG. 5, in the optical transmitting apparatus according to the second embodiment, the waveguides 16-1 to 16-4 are formed on the substrate 13 in such a manner that the optical axis of at least one of the waveguides is inclined with respect to the optical axis of at least one of the collimate lenses 17-1 to 17-4. In the example illustrated in FIG. 5, the optical axis of the waveguide 16-1 guiding the signal light is inclined in the clockwise direction with respect to the optical axis of the collimate lens 17-1. Further, the optical axis of the waveguide 16-3 guiding the signal light is inclined in the clockwise direction with respect to the optical axis of the collimate lens 17-3. In contrast, the optical axis of the waveguide 16-2 guiding the monitor light is inclined in the counterclockwise direction with respect to the optical axis of the collimate lens 17-2. Further, the optical axis of the waveguide 16-4 guiding the monitor light is inclined in the counterclockwise direction with respect to the optical axis of the collimate lens 17-4.

Further, in the optical transmitting apparatus according to the second embodiment, the holding member 18 holds the collimate lenses 17-1 to 17-4 in such a manner that the optical axis of at least one of the collimate lenses is out of alignment in the y-axis direction with the optical axis of at least one of the waveguides. Further, the holding member 18 holds the collimate lenses 17-1 to 17-4 in such a manner that the optical axis of at least one of the waveguides is inclined with respect to the optical axis of at least one of the collimate lenses. As a result of this holding mode, a signal light beam is emitted from each of the collimate lenses 17-1 and 17-3 toward the PBC 20, whereas a monitor light beam is emitted from each of the collimate lenses 17-2 and 17-4 toward the PDs 23-1 and 23-2.

As explained above, in the optical transmitting apparatus according to the second embodiment, the holding member 18 holds the collimate lenses 17-1 to 17-4 in such a manner that the optical axis of at least one of the collimate lenses is out of alignment in the y-axis direction with the optical axis of at least one of the waveguides. Further, the holding member 18 holds the collimate lenses 17-1 to 17-4 in such a manner that the optical axis of at least one of the waveguides is inclined with respect to the optical axis of at least one of the collimate lenses. As a result, the signal light and the monitor light are emitted from the collimate lenses 17-1 to 17-4 in the mutually-different directions. Consequently, according to the second embodiment, it is possible to further enhance the degree of freedom in arranging the positions of the optical component parts that are disposed on the subsequent stage side of the collimate lenses 17-1 to 17-4.

[c] Third Embodiment

Next, an optical transmitting apparatus according to a third embodiment will be explained. The optical transmitting apparatus according to the third embodiment is different from that of the first embodiment only for the mode in which the collimate lenses 17-1 to 17-4 are held. The other configurations are the same as those in the first embodiment. Accordingly, in the description below, the configurations that are the same as those in the first embodiment will be referred to by using the same reference characters, and the explanation thereof will be omitted.

Figure 6:
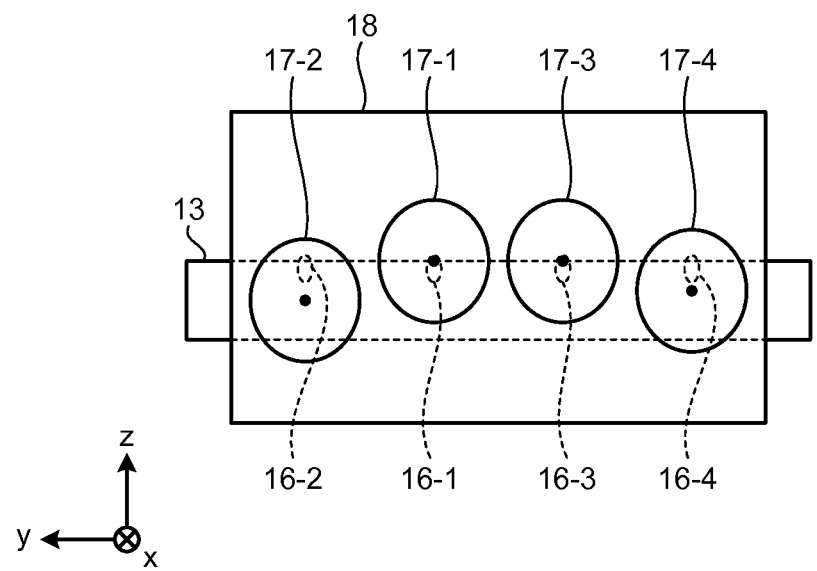
FIG. 6 is a drawing of an exemplary mode in which the holding member holds the collimate lenses according to a third embodiment.
Figure 7:
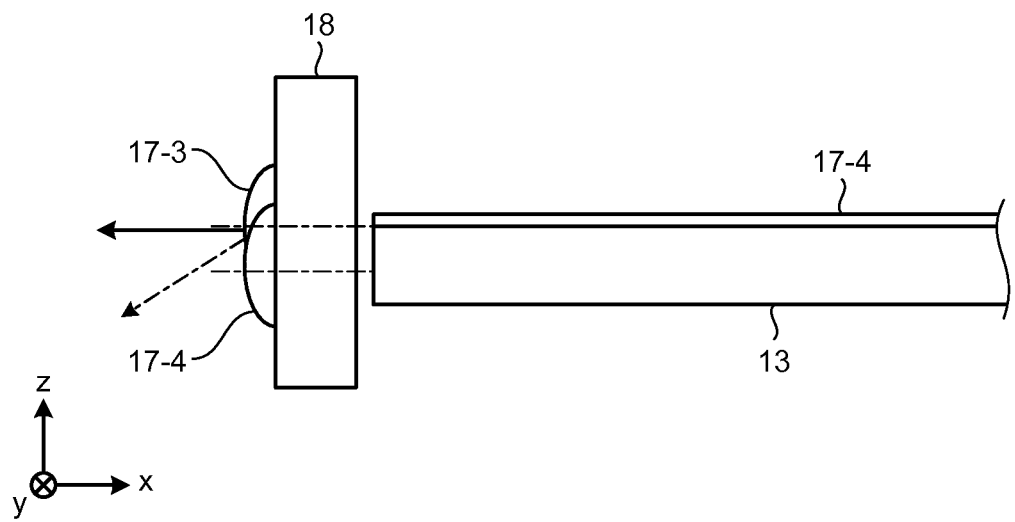
FIG. 7 is another drawing of the exemplary mode in which the holding member holds the collimate lenses according to the third embodiment.

FIGS. 6 and 7 are drawings of an exemplary mode in which the holding member holds the collimate lenses according to the third embodiment. FIG. 6 illustrates the holding mode viewed from the negative direction of the x-axis, whereas FIG. 7 illustrates the holding mode viewed from the negative direction of the y-axis. In FIGS. 6 and 7, the dashed lines indicate the optical axis of each of the waveguides 16-1 to 16-4 and the optical axis of each of the collimate lenses 17-1 to 17-4. Further, the arrows with solid lines indicate optical paths of the signal light beams, whereas the arrows with broken lines indicate optical paths of the monitor light beams.

As illustrated in FIGS. 6 and 7, in the optical transmitting apparatus according to the third embodiment, the holding member 18 holds the collimate lenses 17-1 to 17-4 in such a manner that the optical axis of at least one of the collimate lenses is out of alignment in the thickness direction of the substrate 13, i.e., in the z-axis direction, with the optical axis of at least one of the waveguides. In the example illustrated in FIGS. 6 and 7, the holding member 18 holds the collimate lens 17-1 in such a manner that the optical axis of the collimate lens 17-1 is aligned with the optical axis of the waveguide 16-1 guiding the signal light. Further, the holding member 18 holds the collimate lens 17-3 in such a manner that the optical axis of the collimate lens 17-3 is aligned with the optical axis of the waveguide 16-3 guiding the signal light. In contrast, the holding member 18 holds the collimate lens 17-2 in such a manner that the optical axis of the collimate lens 17-2 is out of alignment in the negative direction of the z-axis with the optical axis of the waveguide 16-2 guiding the monitor light. Further, the holding member 18 holds the collimate lens 17-4 in such a manner that the optical axis of the collimate lens 17-4 is out of alignment in the negative direction of the z-axis with the optical axis of the waveguide 16-4 guiding the monitor light. As a result of this holding mode, a signal light beam is emitted from each of the collimate lenses 17-1 and 17-3 toward the PBC 20, and a monitor light beam is emitted from each of the collimate lenses 17-2 and 17-4 toward the PDs 23-1 and 23-2.

As explained above, in the optical transmitting apparatus according to the third embodiment, the holding member 18 holds the collimate lenses 17-1 to 17-4 in such a manner that the optical axis of at least one of the collimate lenses is out of alignment in the z-axis direction with the optical axis of at least one of the waveguides. Thus, the signal light and the monitor light are emitted from the collimate lenses 17-1 to 17-4 in the mutually-different directions. Consequently, according to the third embodiment, it is possible to further enhance the degree of freedom in arranging the positions, along the thickness of the substrate 13, of the optical component parts that are disposed on the subsequent stage side of the collimate lenses 17-1 to 17-4.

[d] Fourth Embodiment

Next, an optical transmitting apparatus according to a fourth embodiment will be explained. The optical transmitting apparatus according to the fourth embodiment is different from that of the first embodiment only in the arrangement where the monitor light beams received by the PDs 23-1 and 23-2 intersect each other when viewed in the thickness direction of the substrate 13. The other configurations are the same as those in the first embodiment. Accordingly, in the description below, the configurations that are the same as those in the first embodiment will be referred to by using the same reference characters, and the explanation thereof will be omitted.

Figure 8:
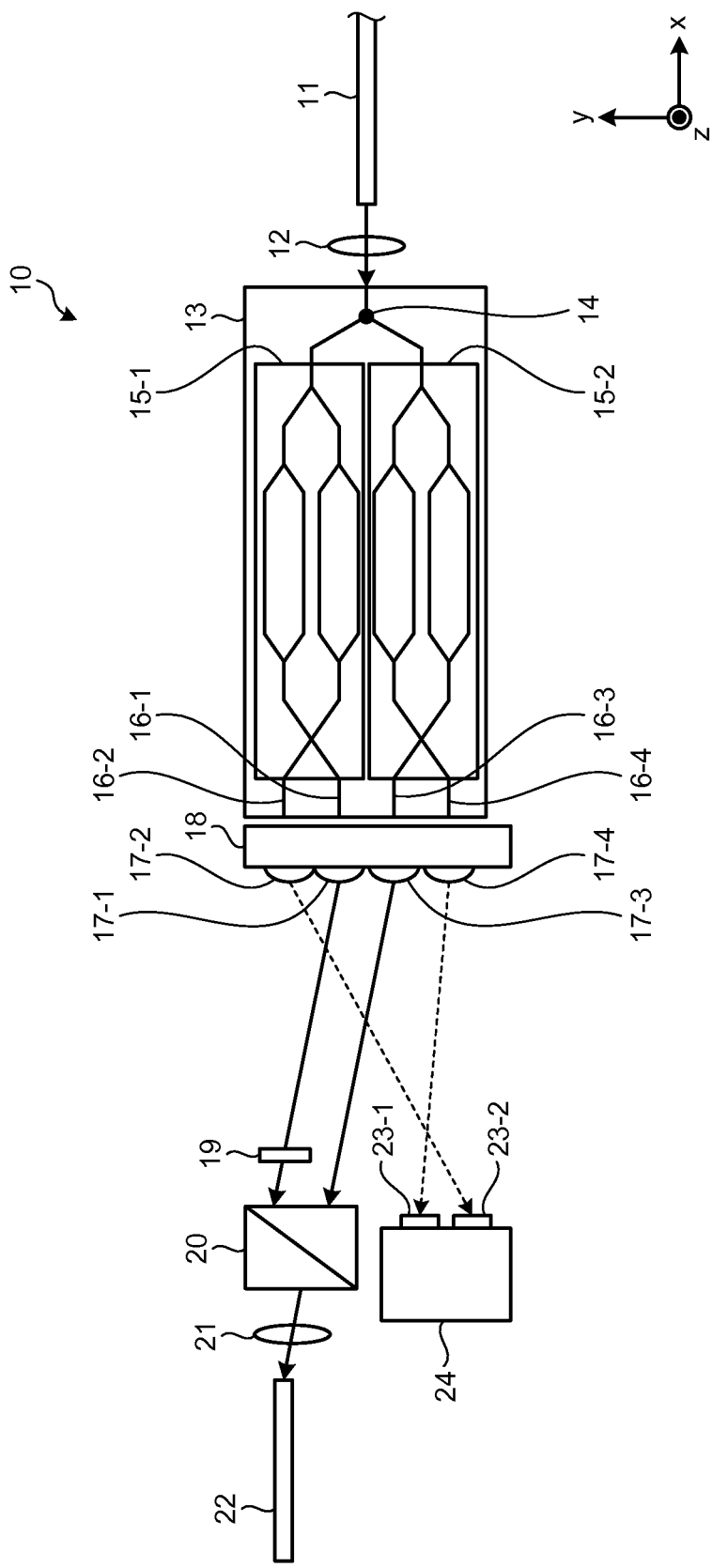
FIG. 8 is a drawing for explaining optical paths of monitor light beams according to a fourth embodiment.

FIG. 8 is a drawing for explaining optical paths of the monitor light beams according to the fourth embodiment. As illustrated in FIG. 8, in the optical transmitting apparatus according to the fourth embodiment, the PDs 23-1 and 23-2 receive the monitor light beams emitted from the collimate lenses 17-4 and 17-2, respectively. In this situation, the monitor light beams received by the PDs 23-1 and 23-2 intersect each other between the collimate lenses 17-1 to 17-4 and the PDs 23-1 and 23-2, when viewed in the thickness direction of the substrate 13, i.e., in the z-axis direction.

As explained above, in the optical transmitting apparatus 10 according to the fourth embodiment, the monitor light beams received by the PDs 23-1 and 23-2 intersect each other between the collimate lenses 17-1 to 17-4 and the PDs 23-1 and 23-2, when viewed in the thickness direction of the substrate 13, i.e., in the z-axis direction. Thus, according to the fourth embodiment, because it is possible to shorten the distance between the collimate lenses 17-1 to 17-4 and the PDs 23-1 and 23-2, it is possible to prevent the apparatus from becoming large-sized along the x-axis direction.

According to an aspect of the optical transmitting apparatus disclosed in the present application, an advantageous effect is achieved where it is possible to prevent the apparatus from becoming large-sized due to the positional relationship among the component parts along the emission direction of the signal light or the monitor light.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitting apparatus comprising:
a substrate;
a plurality of optical modulators that are arranged in parallel to one another on the substrate along a width direction of the substrate and that modulate light;
a plurality of first waveguides that are formed on the substrate and that guide signal light represented by at least one of a plurality of modulated light beams obtained by the light being modulated by the plurality of optical modulators;

a plurality of second waveguides that are formed on the substrate and that guide monitor light represented by at least another one of the plurality of modulated light beams other than the signal light;

a plurality of lenses that collimate the signal light emitted from the plurality of first waveguides and the monitor light emitted from the plurality of second waveguides; and a holding member that causes the signal light and the monitor light to be emitted from the plurality of lenses in mutually-different directions, by holding the plurality of lenses in such a manner that an optical axis of each of the plurality of lenses that collimate the signal light is out of alignment in a positive direction of an axis along the width direction of the substrate with an optical axis of each of the plurality of first waveguides and an optical axis of each of the plurality of lenses that collimate the monitor light is out of alignment in a negative direction of the axis along the width direction of the substrate with an optical axis of each of the plurality of second waveguides.

2. The optical transmitting apparatus according to claim 1, further comprising:

a polarization beam combining element that performs a polarization beam combining process on the signal light emitted from each of the plurality of lenses that collimate the signal light;

a plurality of light receiving elements each of which receives a beam of the monitor light emitted, in a direction different from a direction of the signal light, from each of the plurality of lenses that collimate the monitor light; and a positioning member that arranges the plurality of light receiving elements in positions that are on a side of one of lateral faces of the polarization beam combining element along the predetermined direction.

3. The optical transmitting apparatus according to claim 2, wherein the beams of the monitor light received by the light receiving elements intersect each other between the plurality of lenses and the light receiving elements when viewed in a thickness direction of the substrate.

4. The optical transmitting apparatus according to claim 1, wherein the predetermined direction is the width direction of the substrate.

5. The optical transmitting apparatus according to claim 1, wherein the plurality of waveguides are formed on the substrate in such a manner that the optical axis of the at least one of the plurality of waveguides is inclined with respect to the optical axis of the at least one of the plurality of lenses, and the holding member holds the plurality of lenses further in such a manner that the optical axis of the at least one of the plurality of waveguides is inclined with respect to the optical axis of the at least one of the plurality of lenses.

6. The optical transmitting apparatus according to claim 1, wherein the holding member holds the plurality of lenses in an array formation along the width direction of the substrate.

7. The optical transmitting apparatus according to claim 1, wherein the holding member and the plurality of lenses are formed by using silicon.

8. The optical transmitting apparatus according to claim 1, wherein curvature radii of the plurality of lenses are equal to one another.

\* \* \* \* \*